United States Patent [19]

Vander Velden et al.

[11] Patent Number: 5,494,745
[45] Date of Patent: Feb. 27, 1996

[54] LAMINATED FILM AND METHOD FOR MAKING A LAMINATED FILM

[75] Inventors: Rudolph Vander Velden, Macedon; Ralph J. Weber, Fairport, both of N.Y.

[73] Assignee: Mobil Oil Corporation, Fairfax, Va.

[21] Appl. No.: 162,213

[22] Filed: Dec. 6, 1993

Related U.S. Application Data

[63] Continuation-in-part of Ser. No. 922,418, Jul. 31, 1992, Pat. No. 5,288,548.
[51] Int. Cl.$^6$ .................. B32B 27/00; B32B 7/12; C08F 20/10
[52] U.S. Cl. ............ 428/354; 428/315.9; 428/483; 428/516; 428/520; 428/523; 428/246; 156/297; 156/300; 525/222; 525/228; 525/330.3
[58] Field of Search .............. 428/315.9, 315.5, 428/315.7, 354, 344, 483, 516, 520, 523; 525/222, 228, 330.3; 156/300, 297

[56] References Cited

U.S. PATENT DOCUMENTS

| | | | |
|---|---|---|---|
| 3,753,769 | 8/1973 | Steiner | 525/222 |
| 3,845,163 | 10/1974 | Murch | 525/222 |
| 4,377,616 | 3/1983 | Ashcraft et al. | 428/213 |
| 4,865,908 | 9/1989 | Liu et al. | 428/248 |
| 5,194,324 | 3/1993 | Poirier | 428/315.5 |
| 5,288,548 | 2/1994 | Weber | 428/315.9 |

Primary Examiner—George F. Lesmes
Assistant Examiner—Blaine R. Copenheaver
Attorney, Agent, or Firm—Alexander J. McKillop; Malcolm D. Keen; Jessica M. Sinnott

[57] ABSTRACT

A multilayer laminated structure comprising an olefin film, preferably a polypropylene film having on a first side, of the olefin film, a highly printable blend of (A) alkylene acrylate copolymer and (B) an interpolymer of an alkyl acrylate, an alkyl methacrylate and an alkyl acrylate acid and a woven or nonwoven reinforcement laminated to a second side of the olefin film. The laminated structure is suitable for envelope stock, packaging film and label stock.

21 Claims, 1 Drawing Sheet

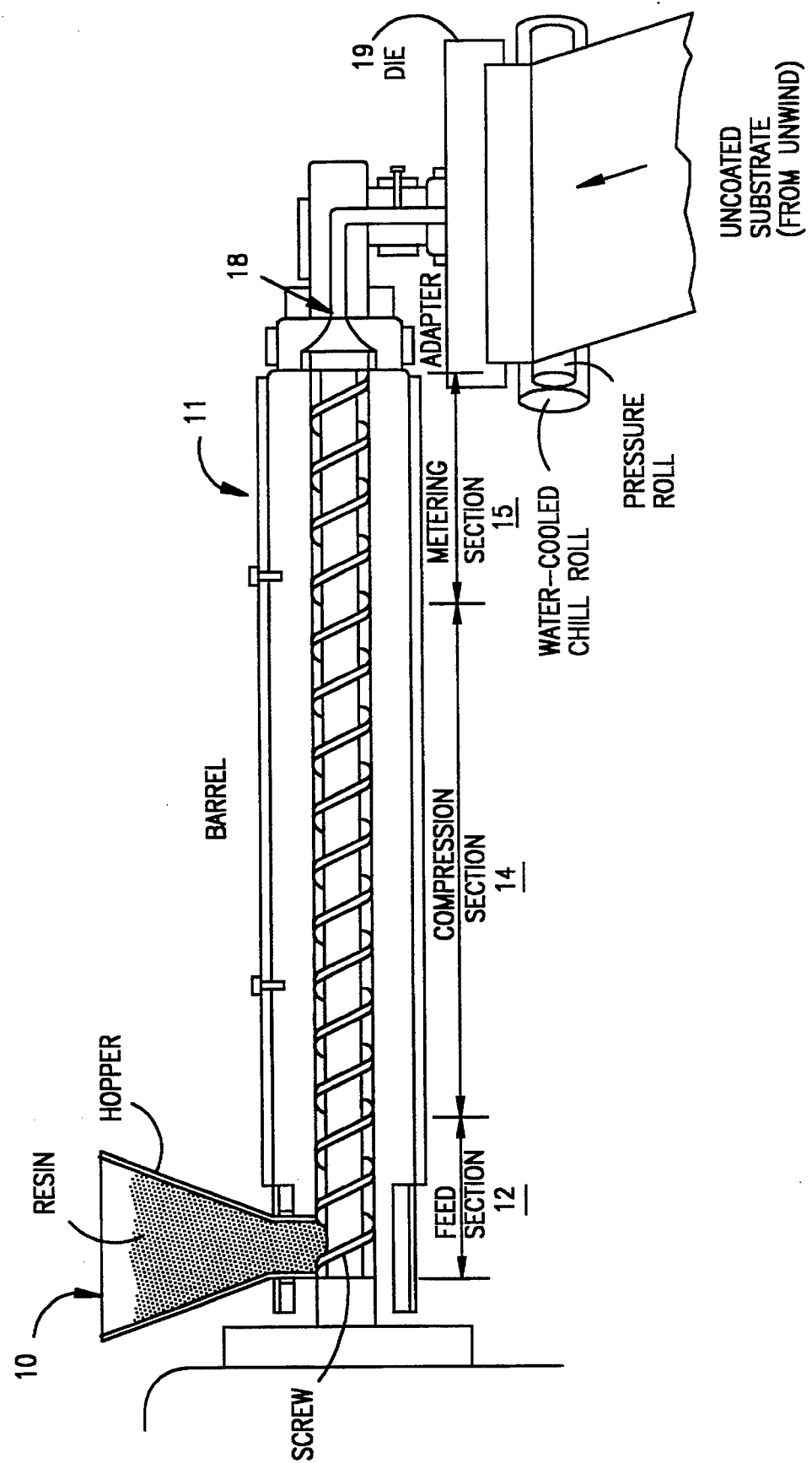

1

LAMINATED FILM AND METHOD FOR MAKING A LAMINATED FILM

CROSS REFERENCE TO RELATED APPLICATIONS

This application is a continuation-in-part of U.S. Ser. No. 07/922,418 filed on Jul. 31, 1992, U.S. Pat. No. 5,288,548 which is incorporated herein by reference in its entirety.

FIELD OF THE INVENTION

This invention relates to a laminated film. In particular, the invention relates to a printable tear-resistant laminated multilayered film. More particularly, the invention relates to a laminated biaxially oriented polymer film structure.

BACKGROUND OF THE INVENTION

Of recent years polymeric films have become a popular choice over paper for envelopes and other types of exterior packaging films which are used to protect goods from damage during transport. An example of a polymeric packaging film is TYVEK manufactured by Dupont which is a popular film used for making Federal Express envelopes. The advantages of synthetic films over paper include tear-resistance, vapor and gas barrier properties, water resistance and ease of handling in automatic machinery. One shortcoming of polymeric films, as opposed to paper, is poor printability, particularly with high speed dot matrix and thermal transfer printers. To overcome this problem, pressure sensitive paper labels which have better printability are separately prepared and affixed to polymeric packaging. However, the inconvenience and waste associated with making and using a separate label are apparent.

To improve the strength and water resistance of paper, or other non-plastics, experts have turned to a process of laminating non-plastics to various thermoplastic films which impart strength and water-resistance. Laminating is a process by which a composite, made of any one of several types of thermosetting plastics, is bonded to a non-plastic material such as paper, cloth, asbestos, wood or glass fiber. A characteristic of these laminates is high tensile and dielectric strength and low moisture absorption. Laminated papers have been particularly useful products which combine the printability of paper with the strength of plastic.

Woven and nonwoven polyolefin films which are tear-resistant and waterproof have been developed. Some of these films have been proposed as reinforcing substrates to impart tear-resistance and strength to other substrates, such as paper. An example of a woven polyolefin film is CLAF manufactured by ANCI, Amoco Nisseki CLAF, Inc. An example of a nonwoven polyolefin film is POLYSCRIM manufactured by Polybond, Inc.

The disadvantages of laminated paper include water sensitivity, lack of flame resistance, and susceptibility to biodegradation. Additionally, paper intermixed with recyclable plastic film presents serious recycling problems because they are not easily separable.

To overcome these disadvantages, plastic films have been considered. Although these films are tear resistant and water proof, they are not easily printable.

There is an increasing need for a film, particularly for packaging, which has the strength and water resistance of plastic combined with the printability of paper.

In U.S. Pat. No. 5,288,548 filed on Jul. 31, 1992, a printable polyolefin film is described for use as a label film. The film comprises a base structure which comprises a film of an olefin polymer which has on one side a blend of one or more alkylene acrylate polymers and an interpolymer of an alpha-beta monoethylenically unsaturated carboxylic acid with (i) a neutral monomeric acrylate ester and (ii) a methacrylic ester.

SUMMARY OF THE INVENTION

This invention relates to a printable polyolefin film which is tear resistant and waterproof. The film will find utility as envelope stock, packaging film and as label stock. Other contemplated uses for the invention include use as sheeted or form fed paper or poly replacement, photocopy paper, wallpaper, luggage tags, currency, postal stamps, contact paper and the like.

The invention relates to a laminated film which includes the following structure:

a multilayered film comprising:

(1) a base structure comprising an olefin polymer film;

(2) on a first side of the olefin polymer film, a blend of (A) one or more alkylene acrylate copolymers and (B) an interpolymer of (i) an alpha-beta monoethylenically unsaturated carboxylic acid and (ii) a neutral monomeric (a) acrylate ester and (b) methacrylic ester; and (2) on a second side of the olefin polymer film, a polymeric reinforcement adhered thereto. A process for making the multilayered film is also described.

In some instances, an adhesive will be applied to the surface of the laminated layer so that the film can be used as a label. In most cases the adhesive layer will be a pressure sensitive adhesive. In other cases the adhesive may be activatable by any means, such as, heat, solvent, etc. This label structure can be carried by a release surface in which the label stock is readily removed from the release surface and applied to another surface.

BRIEF DESCRIPTION OF THE DRAWING

FIG. 1 illustrates a simplified schematic view of a preferred extruder apparatus for carrying out the laminating process of the invention.

DETAILED DESCRIPTION OF THE INVENTION

The invention concerns a laminated film which includes the following structure:

a multilayered film comprising:

(1) a base structure comprising an olefin polymer film;

(2) on a first side of the olefin polymer film, a blend of (A) one or more alkylene acrylate copolymers and (B) an interpolymer of (i) an alpha-beta monoethylenically unsaturated carboxylic acid and (ii) a neutral monomeric (a) acrylate ester and (b) methacrylic ester; and (2) on a second side of the olefin polymer film, a polymeric reinforcement adhered thereto.

The base or core layer for the printable film can be transparent or opaque, preferably white opaque. A material which has excellent tensile strength, low permeability to moisture and other liquids is oriented polypropylene. It is preferred that the base structure is oriented, more preferably, biaxially oriented. A preferred transparent polypropylene base or core layer is multilayered, having two or more coextruded polypropylene layers, one layer of which is thicker than the skin or outer layers. These outer layers may be filled or unfilled with appropriate additives. A preferred opaque base or core material is an oriented polypropylene structure containing a core layer cavitated in a special way so as to produce a pearlescent opaque appearance. A material of this type is described in U.S. Pat. No. 4,377,616 issued to Ashcraft et al. which is incorporated herein by reference in its entirety.

The usual core material is polypropylene, particularly preferred is an isotactic polypropylene containing at least 80% by weight of isotactic polypropylene. It is also preferred that the polypropylene have a melt flow index of about 2–10 g/10 min.

Opacity, which may be provided by opacifying pigment and/or voided core structure, provides an excellent contrasting background for printed material applied to the printing surface of the film. A preferred opaque base structure comprises an oriented multilayer coextruded structure and preferably comprises a cavitated (or voided) core layer. A particularly preferred opaque base structure comprises a voided core layer comprising a polypropylene matrix in which are dispersed void-initiating solid particles which are phase-distinct from the polypropylene matrix and about which particles are located opacifying voids that produce a pearlescent appearance.

It is preferred that the average diameter of any void-initiating particles be from about 0.1 to about 10 microns. These particles may be of any desired smooth shape, although it is preferred that they be substantially spherical.

The skin material coextruded onto one surface of the base or core material to be cavitated, preferably is a medium density polyethylene. This is meant that the density of the polyethylene can be anywhere from about 0.926–0.945. Regarding the employment of a medium density polyethylene, the disclosure of U.S. Pat. No. 5,194,324 issued Mar. 16, 1993, is incorporated herein by reference in its entirety.

It is also contemplated that one side may carry the medium density polyethylene layer while the opposite surface may carry no skin layer or may have any one of a variety of other skin surfaces. For example, the opposite skin material can be noncavitated polypropylene, a copolymer of ethylene and propylene, where the proportion of ethylene is from 2–8%, a terpolymer of ethylene, propylene and butene-1, etc. This skin surface can be any material which will aggressively receive thereon a coating of adhesive to which a reinforcing film will adhere or a coating of liquified reinforcing thermoplastic resin. This aggression must be sufficient to maintain the reinforcing film in close contact with the skin layer. This is particularly important when a pressure sensitive adhesive is applied to the laminated film so that when separation occurs between the adhesive and a release surface the laminated film maintains its integrity.

The essence of the present invention involves employing a particular polymeric blend which results in a layer having excellent receptivity to impact and thermal printing methods. The resulting surface can be printed with high speed equipment that is present in the industry, i.e., 400 lines per minute. The resulting coating has excellent ink adhesion and smear resistance both dry and in the presence of water. This ensures that printing is not jeopardized by ambient conditions.

This polymeric blend is a combination of a mixture of (A) and (B). (A) is one or more alkylene acrylate copolymer. These copolymers have an alkylene group having 2–6 carbon atoms and an alkyl ester group having from 1–8 carbon atoms. These compounds are disclosed, for example, in U.S. Pat. No. and 3,845,163 which is incorporated herein by reference in its entirety. This type of polymer is prepared by copolymerizing an olefin, for example, ethylene or propylene, with one or more of the following monomers: a $C_1$–$C_8$ alkyl acrylate, for example, methacrylate, ethylacrylate, hexylacrylate and the like; a $C_1$–$C_8$ alkyl methacrylate, for example, methyl methacrylate, ethyl methacrylate, hexyl methacrylate and the like; and acrylic acid or methacrylic acid. Preferred are copolymers of ethylene with an alkyl ester of acrylic acid. In general, the acrylate content or methacrylate content of the copolymer may be from approximately 10 to approximately 30% by weight. The olefin content of the copolymer may be from approximately 70 to approximately 90% by weight. An example of the last-mentioned copolymer is an ethylene-ethylacrylate copolymer with a weight ratio of ethylene to ethylacrylate of approximately 4.1 to 1.

Commercially available materials of this type include ethylene-methyl acrylate copolymer identified as Chevron Chemical Company PE 2205, having a methylacrylate content of 20% by weight, and a melt flow index of 2.4 gm/10 min. (ASTM D-1238), ethylene-acrylate acid copolymer having an acrylic acid content of about 6.5% and a melt flow index of 9.0 gm/10 min., available as Dow Primacor 3340 grade; ethylene-acrylic acid copolymer available as Dow Primacor 1430; and ethylene acrylic acid copolymer available as Dow Primacor 5991. A particularly preferred copolymer is obtained as a water emulsion from Michelman, Incorporated and is a 25% solids dispersion of Dow Primacor 5980. This material consists of ethylene copolymerized with acrylic acid.

The (B) component of the blend is typified by an interpolymer of (a) from 2.5 to about 6 parts by weight of an alpha-beta monoethylenically unsaturated carboxylic acid selected from the group consisting of acrylic acid, methacrylic acid and mixtures thereof and (b) from about 97.5 to about 94 parts by weight of neutral monomer esters, said neutral monomer esters comprising (1) methyl acrylate or ethyl acrylate and (2) methyl methacrylate, said interpolymer comprising from about 30% to about 55% by weight of methyl methacrylate when said alkyl acrylate is methyl acrylate, and from about 52.5% to about 69% by weight of methyl methacrylate when said alkyl acrylate is ethyl acrylate; said mixture containing inert inorganic fillers. Material of this type is described in U.S. Pat. No. 3,753,769 the disclosure of which is incorporated in its entirety. A preferred material is that described in Example 1 of the '769 patent.

The polymeric blend of (A) and (B) is prepared as a water based coating formulated as a 20–40% solids dispersion, preferably 30% solids dispersion. The composition can include absorptive, opacifying or whitening inert particles, such as, absorptive silica, calcium carbonate, $TiO_2$, etc. A typical coating composition can include the following:

| | |
|---|---|
| (A) alkylene acrylate copolymer | 35–55% |
| (B) interpolymer | 4–10 |
| silica | 20–40 |
| Calcium carbonate | 5–20 |

This coating composition is applied to the selected base or core material. For example, a product sold by Mobil Chemical Company and identified as 140LL302 LabelLyte™ can be employed. This product is a 3 mil, white opaque label product consisting of a cavitated homopolymer polypropylene core with skin layers on opposite surfaces. The layer which is coated with the polymer blend of the present invention is a medium density polyethylene with a titanium dioxide filler. The opposite skin layer is a homopolymer polypropylene with a calcium carbonate filler. The coating can be applied in a secondary coating process. This refers to a process by which the film is coated in a process separate from the process forming the base or core material. A polymer blend composition can be applied by rod coating technology or by reverse direct gravure techniques. The coating weight on the base material can range from approximately 1–5 grams, preferably 2 grams per MSI.

EXAMPLE

A 3 mil thick three layer LabelLyte™ film as described above, was coated on the medium density polyethylene side with 2 grams per MSI of the following 30% solids water based composition: (A) Dow 5980-ethylene copolymerized with acrylic acid, % dry 45%; (B) the interpolymer of methyl acrylate, methyl methacrylate, and methacrylic acid, % dry 5%, silica 35% and calcium carbonate 15%.

This coated structure has been found to be excellently compatible with impact and thermal printing methods and can be printed at 400 lines per minute.

The coated film is laminated to a reinforcing substrate, typically a polyolefin film, which imparts tear resistance to the coated structure (also referred to as a base structure or primary substrate). Usually, the tear resistant film is a polyolefin. A woven polyolefin is specifically contemplated. Other tear resistant films which will be useful include woven or non-woven extrudable polymers such as polyolefin, nylon, polyester, and other synthetic weavable materials. A specific example of a woven material useful as a reinforcing structure is "CLAF" made by ANCI, Amoco Nisseki CLAF, Inc. This woven substrate is made by a continuous thermo-bonding of co-extruded fibrillated films of high density polyethylene. Non-woven tear resistant plastic films may also be employed and these include a polypropylene SCRIM which is made by Polybond, Inc.

The base structure is bonded to the tear resistant film by a laminating process. Laminating by conventional techniques known in the art can be employed, techniques include extrusion laminating, thermal coating or adhesive laminating. In extrusion laminating, the extruder is used to melt and apply an amount of a melted resin, usually polyethylene, between the web materials being laminated. The melted resin solidifies to form a bond between the webs.

In adhesive laminating, an adhesive-solvent solution is applied to one of the webs. The web is passed through an oven to evaporate the solvent and dry the web. The dried web is then bonded to the second web by contacting the two webs under heat and pressure.

Thermo lamination is a similar process except that the coating, such as an acrylic emulsion, is coated onto the web and passed through an oven where it is introduced to a second web. The webs are passed through heated nip rolls. The coated material allows bonding to occur between the webs.

Extrusion laminating is a process in which the extruded polymer is used as the adhesive to bond the webs. In extrusion laminating the polymer adhesive in the form of pellets is fed to a screw extruder which melts it by heat and friction. The melt is then forced through a die, typically in the form of a straight slot, which permits the melt to coat one film which is then bonded to the second film.

In the art of laminating, the reinforcing layer which is applied to the surface of the coated structure is typically applied by extrusion laminating, thermo laminating or adhesive laminating.

In a specific embodiment of the invention the laminated film is made by an extrusion process. A typical apparatus used to make the invention by extrusion is illustrated in FIG. 1. Referring to FIG. 1, the polyethylene composition, typically, a low density polyethylene resin (LDPE) such as LDPE 1017 manufactured by Chevron, is fed from a hopper 10 into the feed section 12 of a screw-extruder device 11. The polyethylene composition is advanced from feed section 12 to compression section 14 wherein the polyethylene composition is melted by mechanical working and optionally, also, by application of heat thereto. The polyethylene composition melt is continuously advanced from compression section 14 to metering section 15 which pumps the melt forward at a uniform rate controllable by the rate of rotation of the screw and the temperature and viscosity of the melt. The polyethylene composition can be mixed with one or more additives which are introduced at various injection ports (not shown) which are in communication with the various sections of the extruder. Usually, the heat increases through each section such that the temperatures in the feed section range from about 200° F. to about 400° F. (approximately 93° C. – 204° C.), specifically about 330° to about 390° F. (approximately 166° C. – 199° C.), even more specifically about 380° F. (approximately 193° C.) the temperatures in the compression section range from about 500° F. to about 550° F. (approximately 260° C.–288° C.), specifically about 520° F. (approximately 271° C.) in a first zone 14a and increase from about 575° F. to about 625° F. (approximately 302° C. – 329° C.) in a second zone 14b. In the metering section the temperature of the melt reaches a range of about 615° F. to about 685° F. (approximately 324° C. – 363° C.), specifically from about 618° F. to 620° F. (approximately 326° C. – 327° C.). The polyethylene composition is continuously advanced until it reaches discharge section 18 at the nose of the extruder and discharged into die member 19 adapted to extrude the composition onto the uncoated substrate travelling at about 50 to about 1000 FPM (foot/meter), specifically about 200–300 FPM.

For successfully laminating the polyolefin film to the woven or nonwoven polymer, good adhesion is required. Adhesion requires contact, on the scale of a few hundred picometers ($10^{-8}$ cm) over large surface areas. A practical way to do this is to liquefy an adhesive and have it completely cover the surface of one film, such as by the above described screw extruder, then attach it to the other film under pressure and heat. This is most useful when applying a woven tear resistant film to the printable polyolefin film. When laminating a non-woven reinforcing film to the printable polyolefin film, it may be useful to completely liquify the non-woven reinforcing film, completely wet the surface of the printable polyolefin film and then solidify after contact is established.

There are a wide range of useful polymeric binders that can be used as a matrix for reinforcing the printable film. In general any polymeric resin that can be liquefied and used to wet the printable film can be employed. Typical examples of useful polymeric binders include polyester, epoxy, synthetic elastomers, such as thermoplastics. Usually, thermoplastics are employed. These include nylon, polystyrene, polyethylene, polypropylene, styrene/acrylonitrile, polycarbonate and polysulfone In one embodiment of the invention, the laminated film can be used as a label carried by a release sheet or surface.

A common example of this type of label structure, familiar to most automobile owners, is the county or city registration sticker which must be applied to the windshield of a car. This type of structure comprises a release sheet, one side of which has a release surface of a silicon material or the like. Carried on this surface is a pressure sensitive adhesive and applied to the pressure sensitive adhesive is the label or decal to be applied to the windshield. The adhesive may be applied either to the label or the release liner. When the decal or label is separated from the release sheet the pressure sensitive adhesive preferentially adheres to the label or decal and by this means is affixed to the windshield of the car. For the labeling of cans or bottles, obviously a more automated system must be employed. Providing for a more or less continuous labelling system, a continuous release roll is prepared by applying to one side of a continuous substrate which is preferably a polymeric film and still more preferably a polypropylene film and which may be of a single or multiple layers, a release coating of silicon or the like. Thereafter, for example, the release face of the release liner of the type described above is coated with a layer of pressure sensitive adhesive. Thereafter, a label stock as described above which has been or will be printed with the appropriate label incidia, is brought into mating contact with the pressure sensitive adhesive. Following this mating, printing can be accomplished, if not already completed and individual labels can be die-cut severed in a manner well known to the art. Following this procedure, labels then can be sequentially, individually applied to a product surface by causing the individual labels to separate from the release surface and having the adhesive side of the label contact and product to be labeled.

As indicated above, instead of a pressure sensitive adhesive, activatable adhesives can be employed for certain labeling techniques. For instance, when a label is to be applied about the full circumference of a package or bottle, a water or other solvent can activate an adhesive stripe or strip applied to one end of the label. The label is then fixed in place by a slight overlap of the other end of the label.

The following Table 1 presents a comparison of the tear resistance measured in the Elmendorf Tear Test of laminated films made in accordance with this invention and an unlaminated polymeric film. Film 1 is an 8 mil (0.008 inch) thick printable film made in accordance with the procedure described in the example laminated to a nonwoven polypropylene tear resistant film (a polypropylene SCRIM manufactured by Polybond, Inc.). Film 2 is a 7 mil (0.007 inch) thick film, made from the printable film used in Film 1, laminated to a woven polypropylene film (CLAFF manufactured by Amoco Nisseki). Film 3 is a 5.53 mil (0.006 inch) thick commercial unlaminated polypropylene film used in making Federal Express envelopes (TYVEK manufactured by Dupont). Film strength is measured in terms of the amount of weight required to tear a film (of a given thickness) in both the machine direction (MD) and transverse direction (TD).

TABLE 1

| Film | MD (gms) | TD (gms) |
|---|---|---|
| 1 | 757 | 480–8.0 mil |
| 2 | 986 | 474–7.0 mil |
| 3 | 489 | 448–5.53 mil |

From the data reported in Table 1 it is apparent that films made in accordance with this invention are much stronger than unlaminated polypropylene films. Film 3 achieve an MD of only 489 and a TD of 448. The films of this invention exceeded both of these measurements which demonstrates superior properties over the unlaminated easily printable films.

What is claimed is:

1. A multilayer film comprising:
   (1) a base structure comprising an olefin polymer film;
   (2) on a first side of the olefin polymer film, a blend of (A) one or more alkylene acrylate copolymers having an alkylene group of 2–6 carbon atoms and alkyl ester group of 1–8 carbon atoms and (B) an interpolymer of (a) from about 2.5 to about 6 parts by weight an alpha-beta monoethylenically unsaturated carboxylic acid selected from the group consisting of acrylic acid, methacrylic acid and mixtures thereof and (b) from about 97.5 to about 94 parts by weight of neutral monomer esters, said neutral monomer esters comprising (1) methyl acrylate or ethyl acrylate and (2) methyl methacrylate; and
   (3) on a second side of the olefin polymer film which opposes the first side of the film, a reinforcement adhered thereto.

2. The film of claim 1 wherein said base structure is transparent or opaque.

3. The film of claim 2 wherein said base structure is a multilayer coextruded structure.

4. The film of claim 3 wherein said structure has a comparatively thick layer and a comparatively thin skin layer on at least one side thereof.

5. The film of claim 4 wherein said structure is an opaque structure having a cavitated core layer with comparatively thin skin layers on opposite sides thereof.

6. The film of claim 5 wherein said skin layers contain inorganic filler material.

7. The film of claim 6 wherein one skin layer is of a medium density polyethylene containing an inorganic filler and this skin layer has the blend of (A) and (B) applied thereto; and the other skin layer is polypropylene with an inorganic filler therein.

8. The film of claim 7 wherein said alkylene acrylate copolymer (A) is a member selected from the group consisting of ethylene acrylic acid, ethylene methylacrylate, ethylene-ethylacrylate, ethylene butylacrylate, ethylene propylacrylate and mixtures thereof.

9. The film of claim 8 wherein said blend ranges from 70–95% by weight of (A) to from 5–30% by weight of (B) and said blend contains from 3–60% by weight of said inert fillers.

10. The film of claim 1 in which the reinforcement is a woven fiber.

11. The film of claim 10 in which the woven fiber is a polyolefin, nylon or polyester.

12. The film of claim 11 in which the polyolefin is polypropylene.

13. The film of claim 1 in which the reinforcement is an extrudable material.

14. The film of claim 13 in which the reinforcement is a polyolefin, nylon, or polyester.

15. The film of claim 1 in which the (A) alkylene acrylate copolymer is prepared by copolymerizing an olefin with one or more of the following monomers: (i) methacrylate, ethylacrylate or hexylacrylate; (ii) methyl methacrylate, ethyl methacrylate, hexyl methacrylate; or (iii) acrylic acid or methacrylic acid.

16. The film of claim 15 in which the olefin is ethylene or propylene.

17. The film of claim 1 in which polyethylene adheres the reinforcement to the second side of the olefin polymer film.

18. A multilayer film comprising a base structure comprising an oriented polypropylene film having on one side thereof a blend of (A) one or more alkylene acrylate copolymer, and (B) an interpolymer of (a) from 2.5 to about 6 parts by weight of an alpha-beta monoethylenically unsaturated carboxylic acid selected from the group consisting of acrylic acid, methacrylic acid and mixtures thereof and (b) from about 97.5 to about 94 parts by weight of neutral monomer esters, said neutral monomer esters comprising (1) methyl acrylate or ethyl acrylate and (2) ethyl methacrylate, said interpolymer comprising from about 30% to about 55% by weight of methyl methacrylate when said alkyl acrylate is methylacrylate, and from about 52.5% to about 69% by weight of methyl methacrylate when said alkyl acrylate is ethylacrylate; said mixture containing inert inorganic fillers; and on a second side of the olefin polymer film, a woven or nonwoven polypropylene reinforcement adhered thereto.

19. A method of making a multilayered film comprising the steps of:

(1) applying to a base structure comprising an olefin polymer film, a blend of (A) one or more alkylene acrylate copolymers having an alkylene group of 2–6 carbon atoms and alkyl ester group of 1–8 carbon atoms and (B) an interpolymer of (a) from about 2.5 to about 6 parts by weight an alpha-beta monoethylenically unsaturated carboxylic acid selected from the group consisting of acrylic acid, methacrylic acid and mixtures thereof and (b) from about 97.5 to about 94 parts by weight of neutral monomer esters, said neutral monomer esters comprising (1) methyl acrylate or ethyl acrylate and (2) methyl methacrylate; and (2) adhering, on a second side of the olefin polymer film which opposes the first side of the film, a reinforcement film.

20. The process of claim 19 in which said interpolymer comprising from about 30% to about 55% by weight of methyl methacrylate when said alkyl acrylate is methyl acrylate, and from about 52.5% to about 69% by weight of methyl methacrylate when said alkyl acrylate is ethyl acrylate; said mixture containing inert inorganic fillers.

21. The process of claim 20 in which the reinforcement film is a woven or nonwoven polyolefin.

* * * * *